(12) United States Patent
McGrath et al.

(10) Patent No.: US 6,716,936 B1
(45) Date of Patent: Apr. 6, 2004

(54) CASCADED BOILING POOL SLURRY REACTORS FOR PRODUCING BIMODAL LOW TO MEDIUM DENSITY POLYETHYLENE POLYMERS

(75) Inventors: Patrick J. McGrath, Houston, TX (US); Ronald J. Morris, Friendswood, TX (US); Roy W. Kreitz, Pasadena, TX (US)

(73) Assignee: Equistar Chemicals L.P., Houston, TX (US)

( * ) Notice: Subject to any disclaimer, the term of this patent is extended or adjusted under 35 U.S.C. 154(b) by 0 days.

(21) Appl. No.: 10/320,003

(22) Filed: Dec. 16, 2002

(51) Int. Cl.[7] .................................................. C08F 2/12
(52) U.S. Cl. .......................... 526/65; 526/70; 526/352; 526/348.2; 526/348.3; 526/348.4; 526/385.5; 526/348.6; 526/352.2; 526/903; 526/905
(58) Field of Search .............................. 526/65, 70, 352, 526/348.2, 348.3, 348.4, 348.5, 348.6, 352.2, 903, 905

(56) References Cited

U.S. PATENT DOCUMENTS

| | | |
|---|---|---|
| 2,885,389 A | 5/1959 | Schappert |
| 2,918,460 A | 12/1959 | Schappert |
| 3,126,460 A | 3/1964 | Hooker |
| 4,003,712 A | 1/1977 | Miller et al. |
| 4,068,054 A | 1/1978 | Willcox |
| 4,117,219 A | 9/1978 | Kakogawa et al. |
| 4,126,743 A | 11/1978 | Shiomura et al. |
| 4,128,607 A | 12/1978 | Shiomura et al. |
| 4,190,614 A | 2/1980 | Ito et al. |
| 4,212,961 A | 7/1980 | Kobayashi et al. |
| 5,064,802 A | 11/1991 | Stevens et al. |
| 5,153,157 A | 10/1992 | Hlatky et al. |
| 5,198,401 A | 3/1993 | Turner et al. |
| 5,241,025 A | 8/1993 | Hlatky et al. |
| 5,326,835 A | 7/1994 | Ahvenainen et al. |
| 5,332,706 A | 7/1994 | Nowlin et al. |
| 5,384,299 A | 1/1995 | Turner et al. |
| 5,408,017 A | 4/1995 | Turner et al. |
| 5,414,180 A | 5/1995 | Geerts et al. |
| 5,470,927 A | 11/1995 | Turner et al. |
| 5,559,761 A | 9/1996 | Frenkel et al. |
| 5,637,660 A | 6/1997 | Nagy et al. |
| 5,648,440 A | 7/1997 | Sugano et al. |
| 5,977,251 A * | 11/1999 | Kao et al. ..................... 525/53 |
| 6,221,982 B1 | 4/2001 | Debras et al. |
| 6,225,421 B1 | 5/2001 | Promel et al. |
| 6,232,260 B1 | 5/2001 | Nagy et al. |
| 6,291,386 B1 | 9/2001 | Wang |

FOREIGN PATENT DOCUMENTS

GB          826562          1/1960

* cited by examiner

Primary Examiner—William Cheung
(74) Attorney, Agent, or Firm—Brooks Kushman P.C.

(57) ABSTRACT

The use of two or more light solvent boiling pool reactors in series allows polymerization of ethylene and comonomer(s) to cost effectively produce bimodal polyethylene copolymers having lower densities than are practically achievable with conventional stirred tank, slurry loop or gas phase reactor technologies. Introducing catalyst to only the first reactor, operating the first reactor at high hydrogen compositions, and using a plurality of series-connected flash drums to remove hydrogen from the first reactor polymer slurry product stream allows for the production of highly homogeneous high molecular weight bimodal polyethylene resins.

19 Claims, 1 Drawing Sheet

CASCADED BOILING POOL SLURRY REACTORS FOR PRODUCING BIMODAL LOW TO MEDIUM DENSITY POLYETHYLENE POLYMERS

BACKGROUND OF THE INVENTION

1. Field of the Invention

The present invention is directed to the field of polymerization of ethylene to prepare low to medium density bimodal polyethylene polymers.

2. Background Art

The greatest part of commercial polyethylene production occurs in gas phase and slurry loop processes. Gas phase processes are in widespread use, and are typified by processes such as that disclosed in U.S. Pat. No. 4,003,712. In such processes, the temperature and pressure are selected such that ethylene and comonomers are introduced at the lower end of a vertical reactor in gaseous form, and, in addition to serving as the monomer source, also serve to fluidize the bed of polyethylene polymer particles as they rise to the bulbous head of the reactor. Polyethylene particle product falls along the internal walls and is harvested from the bottom section of the reactor. Such reactors have several noted disadvantages: gas phase reactors are technologically complex and require process conditions to be controlled very precisely in order to maintain normal operation; fouling and electrostatic phenomena limit the range of products that can be produced; bimodal resins are difficult to prepare and increase technological complexity, often requiring multiple catalysts; and the cascading of such reactors is very difficult if not practically impossible.

Slurry loop reactors are also in widespread use. Loop reactors may be of horizontal or vertical configuration, and are multiple loop, tube-within-tube reactors, with coolant flow directed through the space between the concentric tubes. Polymerization takes place in a liquid carrier solvent, generally isobutane, the reactants and polymer being driven around the loop by a large capacity pump. Loop reactors are operated at nominally 600 psi (41.4 bar) to ensure the reaction system operates liquid full, i.e. above the vapor pressure of the solvent mixture, so that proper slurry recirculation and heat transfer is maintained. Product takeoff may be continuous, but is generally by means of multiple settling legs where polymer particles partially sediment and are removed at intervals, at a higher solids content than the solids content of the reactor itself. A typical slurry reactor is illustrated in U.S. Pat. No. 4,068,054.

It has been proposed to cascade slurry loop reactors to produce bimodal resins, but generally only when the first reactor is operated hydrogen-free. In U.S. Pat. No. 6,221,982, it has been proposed to remove hydrogen from a first cascaded slurry reactor by employing a separate catalyst in the reactor effluent which causes hydrogenation of unreacted ethylene, a process wasteful of both hydrogen and ethylene, and which requires the addition of an expensive metallocene catalyst which does not contribute to polymer production. In U.S. Pat. No. 6,225,421, it has been proposed to remove hydrogen from the effluent of a first cascaded slurry reactor, but no details of any removal method are given. By hydrogen is meant diatomic hydrogen.

Although slurry loop reactors are generally more robust systems than gas phase reactors, they are nevertheless prone to foul during the production of high melt index and lower density resins. Lower molecular weight polyethylene oligomers and waxes tend to be soluble in the continuous phase, and addition of increasing amounts of higher olefin comonomers such as 1-butene and 1-hexene to produce low to medium density resins render the polyethylene copolymer product increasingly soluble. Below a density of about 0.95, the reactor mixture becomes increasingly "soupy." In order to operate under such conditions, the coolant temperature has to be raised to prevent fouling, which necessarily requires production rates to be reduced, thus negatively impacting the process operating economics.

Heavy solvent stirred tank series reactor technology has been commercially employed to produce bimodal polyethylene copolymers for over two decades. Stirred tank reactors are less technically complex than gas phase or slurry loop polyethylene reactors. Generally, stirred tank reactors are designed with a nominal aspect ratio (height:diameter) of 4. Slurry reactors are usually jacketed vessels, which typically employ steam for heating up the reactor system for startup. Heavy solvent stirred tank polyethylene reactors typically operate at low to moderate pressures (50 to 350 psi; 3.4 to 24 bar), at a temperature similar to both gas phase and slurry loop reactors (140° F. to 190° F. (60–88° C.)). Like loop reactors, the reaction mixture is a solid/liquid slurry consisting primarily of polymer and a liquid carrier solvent, generally hexane. The homogeneity of the slurry is maintained by mixing, generally with a conventional agitation and baffling system, such as shaft driven disk turbine agitators with reactor wall baffles. Also like gas phase and loop reactors, the heat of polymerization in a stirred tank reactor is removed, i.e. reaction temperature is controlled, using sensible heat transfer, typically with cooling water in the reactor jacket, with internal coolers, with external coolers, or any combination thereof.

Heavy solvent stirred tank polyethylene reactors are generally simpler and more robust than either gas phase or loop reactor systems. However, like loop reactors, stirred tank reactors are prone to foul during the production of high melt index (low molecular weight) and lower density (high comonomer composition) resins, a problem that is exacerbated by the higher degree of miscibility that low molecular weight and lower density polyethylene have in the heavy hexane solvent. Thus, bimodal polyethylene copolymers with densities below nominally 0.930 cannot be practically manufactured with heavy solvent stirred tank reactors in series processes.

Heavy solvent stirred tank reactor processes are also generally more expensive to build and operate than gas phase or loop reactor processes due to the difficulty in separating the heavier solvent from the product polyethylene, which typically requires centrifuges and complex mechanical drying equipment. Such equipment is both more expensive and less reliable than the polymer drying systems employed in gas phase and loop reactor manufacturing systems.

Boiling pool reactors have been proposed long ago, for example in several patents assigned to the Koppers Co., i.e. U.S. Pat. Nos. 2,885,389; 2,918,460; 3,126,460; and GB Patent 826,562. In the processes disclosed, elongated vertical reactors are operated in a slurry mode at a pressure and temperature such that the hydrocarbon continuous phase boils, and is subsequently condensed and returned to the reactor. While a number of solvents including propane are mentioned, all the polymerizations involve use of pentane, hexane, or cyclopentane. No copolymerization is disclosed, and only relatively high molecular weight products are produced. While boiling pool technology was disclosed as early as 1955, the use of these reactors to prepare polyethylene commercially is unknown, although polypropylene is commercially produced in such processes. No boiling pool series reactor processes or bimodal polyethylene manufacturing processes are disclosed.

It would be desirable to provide a flexible process for the preparation of polyethylene copolymers with a bimodal molecular weight distribution which is more operationally robust than gas phase or slurry loop processes, provides competitive installed costs and operating economics, and in which great flexibility in both hydrogen and comonomer usage is possible. It is also desirable to provide a process where bimodal polyethylene polymers may be prepared in a slurry reactor at densities lower than those achievable with existing heavy solvent series reactor technology.

SUMMARY OF THE INVENTION

The present invention pertains to a two stage polyethylene copolymerization process involving two series connected adiabatic boiling pool reactors employing light solvent. By means of the inventive process, it has been surprisingly discovered that low to medium density bimodal polyethylene copolymers may be readily produced without resort to complex and expensive product drying processes.

DETAILED DESCRIPTION OF THE PREFERRED EMBODIMENTS

Figure 1:
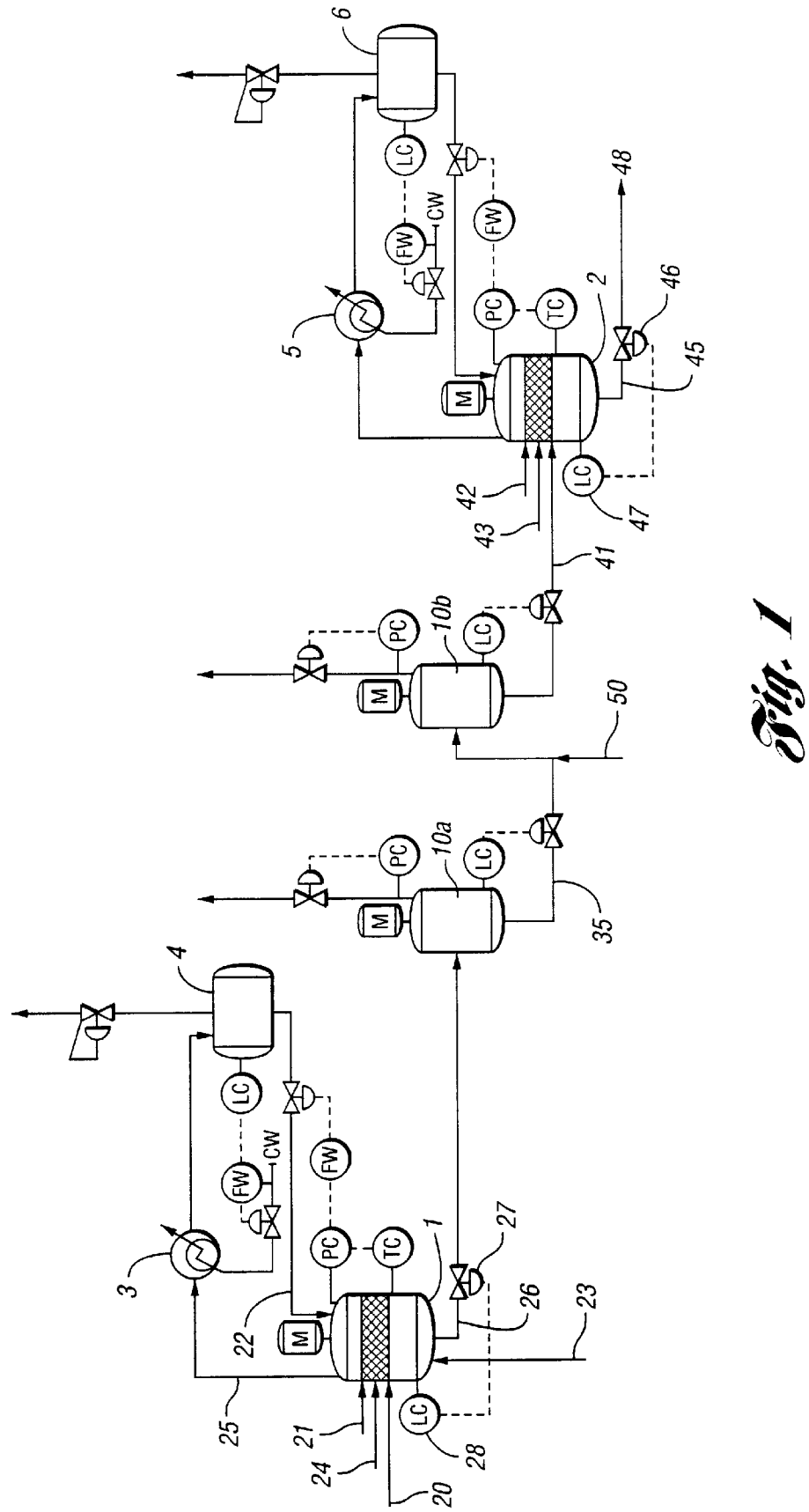
FIG. 1 illustrates schematically a preferred embodiment of the subject invention ethylene polymerization system having an intermediate slurry hydrogen removal system employing a cascade of flash drums to enable efficient removal of hydrogen from a prior product stream before introduction into a second reactor.

The process of the present invention is directed to the slurry preparation of low to medium density, multimodal polyethylene homopolymers or copolymers in a cascade of minimally two essentially adiabatic boiling pool reactors employing light solvent as the continuous phase. The polyethylene copolymers are copolymers of ethylene and at least one higher olefin, and preferably have a density of 0.940 or less. The light solvent is selected from propane and isobutane.

The higher olefin comonomers include any which are capable of copolymerization with ethylene, and preferably include, without limitation, propene, 1-butene, 2-butene, 1-pentene, 1-hexene, 1-octene, 1-decene, 1-dodecene, 1,3-butadiene, cyclohexene, cyclopentene, cyclooctene, and norbornene. Minor amounts of other copolymerizable unsaturated non-aliphatic comonomers may also be used, but are not preferred. Examples include styrene, α-methylstyrene, methyl(meth)acrylate, acrylic acid, vinyl acetate, and higher vinyl esters. Ethylene comprises at least 50% of the total monomer incorporated into the polymer on a mole percentage basis, preferably 70% or more. Most preferably, the comonomers are selected from the group consisting of 1-butene, 1-hexene, 1-octene, and mixtures thereof.

The polymerization is initiated in the presence of a polymerization catalyst. Suitable catalysts include all catalysts which are capable of polymerizing ethylene and comonomers at commercially useful rates. Examples of such catalysts include "chrome catalysts", the so-called "Ziegler" or "Ziegler-Natta" metal complexes, and the more recent organometallic catalysts of the type often referred to as "single site catalysts." The latter include organometallic compounds of numerous classes, including metallocenes such as bis(cyclopentadienyl)zirconium dichloride and bis(cyclopentadienyl)zirconium dimethyl, their titanium and hafnium analogous, and catalysts such as those disclosed in U.S. Pat. Nos. 5,408,017; 5,198,401; 5,559,761; 5,470,927; 5,384,299; 5,064,802; 5,637,660; and 6,232,260.

The Ziegler-Natta catalysts generally require a trialkylaluminum or dialkylmagnesium compound as an "activator" or "cocatalyst", while the single site catalysts generally require a sterically bulky, non-coordinating anion or an alumoxane as an activator or cocatalyst, often with aluminum alkyls added to the polymerization as protic scavengers, particularly as water scavengers. Examples of activators and their method of incorporation into the catalyst system are disclosed in U.S. Pat. Nos. 5,153,157; 5,198,401; 5,408,017; 5,198,401; 5,559,761; 5,470,927; 5,384,299; 5,064,802; 5,241,025; 5,332,706; 5,414,180; 5,648,440; and 5,064,802. Use of scavengers is described in U.S. Pat. No. 6,291,386. All of the foregoing patents are incorporated herein by reference.

The aforementioned polymerization catalysts are generally supported. The catalyst supports are conventional, and may be any porous, finely particulate support, including without limitation alumina, silica, silicates, and like. Finely particulate preformed polymer may also be used as a support. The support is treated with catalyst and optionally with additives and reaction moderators as described in the art. Due to the flexibility of the reaction, many supported catalysts and catalyst/activator combinations are useful.

The polymerization takes place in light aliphatic carrier solvent. The reactors are operated adiabatically, or with a slight amount of heat input, at a temperature and pressure such that the light solvent mixture boils. The heat of polymerization, about 1450 BTU/lb (3424 k J/kg) for polyethylene, is removed by the heat of vaporization of the liquid mixture. The light solvent vapor is condensed, optionally subcooled, and returned to the reactor to control reactor pressure. Reactor pressure is varied to control reactor temperature.

Operating the reactors adiabatically, optionally with heat input to a reactor jacket, is critically important for preventing fouling during the production of high melt index and/or low density polymers. If polymer slurry wetted surfaces are maintained at temperatures above the temperature of the reaction mixture, dissolved species will not precipitate on those surfaces, and therefore reactor fouling will be avoided.

By the term "adiabatic" is meant that the reactor contents are maintained at the bubble point substantially by the heat of polymerization of the unsaturated monomers and return of optionally sub-cooled light solvent condensate from the reactor. The term "adiabatic" does not imply that no heat is input to the reactor. For example, heat is generally necessary to establish start-up conditions. Moreover, addition of some heat to the reactor jacket is desired in some cases to ensure that reactor walls which contact the reactor contents are maintained at or above the temperature of the reactor contents themselves. Any additional heat introduced will be removed by the light solvent condenser system, and the established reactor temperature and pressure will be maintained by an increased return of light solvent condensate or by lowering the temperature of the light solvent condensate. It is most efficient to input only the minimum amount of heat necessary to maintain the reactor surfaces at the desired level. However, it would not depart from the spirit of the invention to apply additional heat, which would result in an economic penalty with respect to energy usage and might require higher capacity condenser(s) and subcooler(s).

The two boiling pool reactors may have numerous geometries, but are preferably tank reactors having an aspect ratio (height:diameter) of 4 or less. The reactors are preferably insulated and may be jacketed for heating purposes, which is preferred. The reactors are preferably equipped with a conventional agitation and optional baffling systems, such as shaft driven disk turbine agitators with reactor wall baffles. The material of construction of the reactors is not critical. Conventional materials such as carbon steel are preferred.

The reactors are equipped with one or more inlets for supply of reactants, and in the case of the second or subsequent reactor(s), an inlet for polymer slurry from the first or a preceding reactor. The reactors are also equipped with a polymer slurry takeoff, in general located at or proximate to the bottom of the reactor. The polymer slurry takeoff is ordinarily valved, and may be operated continuously or discontinuously, however a continuous polymer slurry takeoff system is preferred. In discontinuous operation, the takeoff may be termed a settling leg. More than one takeoff may be provided, particularly when discontinuous withdrawal of product is contemplated. In such a case, the takeoffs or "settling legs" are generally operated sequentially.

The reactor also includes a solvent vapor outlet for escaping vapor from the boiling solvent in the reactor, this outlet leading to a condenser for solvent condensation. The condensed solvent is returned to the reactor, optionally after being chilled to a temperature below its boiling point, i.e. the solvent is optionally subcooled. The use of subcooled solvent facilitates pressure and temperature control of the reactor.

The solvent vapor leaving the reactor also contains, in general, unreacted monomer, principally ethylene, hydrogen gas when used, as well as inert gases such as methane, ethane, and nitrogen. Ethylene, hydrogen, and any comonomers in the vapor stream may be recovered by conventional techniques and returned to the reactor, may be directed to a boiler and burned for fuel value, or both.

The polymer slurry takeoff from the first reactor or from subsequent reactors other than the final reactor in the cascade may, on occasion, be introduced directly into a subsequent reactor. However, it is more appropriate, in most instances, to direct the polymer slurry takeoff to an intermediate hydrogen removal system, such as a flash drum or to a series of flash drums to remove hydrogen, and inert gases. A suitable multiple flash drum hydrogen removal system is disclosed in U.S. application Ser. No. 10/116,404, herein incorporated by reference.

The use of at least one flash drum, preferably a cascade of at least two flash drums, or other separation means is necessary if hydrogen gas is employed during polymerization in the first or a "preceding" reactor, where the next (subsequent) reactor in the cascade employs hydrogen at lower concentration. It is critically important that the polymer slurry feed to a subsequent reactor be nearly or completely hydrogen depleted in order to manufacture high molecular weight polymer in a subsequent reactor, and to maintain adequate control of the molecular weight distribution of the polymer in the subsequent reactor. The vapor streams from the intermediate hydrogen removal system (typically a flash drum or drums) are preferably routed to a solvent recovery system for monomer, comonomer, solvent, and optionally hydrogen recovery. Inert gases are purged from the solvent recovery system and are preferably directed to a boiler and burned for fuel value.

The last reactor in the cascade is generally equipped with the same type of polymer slurry takeoff as in other reactors, i.e. a continuous takeoff, or multiple settling legs. The product polymer is harvested from the polymer slurry takeoff stream conventionally, typically in multiple flash drums, to produce a polyethylene particle product containing little solvent. Residual traces of solvent may be removed under vacuum or with the aid of a flow of inert gas, preferably nitrogen. The vapor streams from the polymer harvesting system (typically a flash drum or drums) are preferably routed to a solvent recovery system for monomer, comonomer, solvent, and optionally hydrogen recovery. Inert gases are purged from the solvent recovery system and are preferably directed to a boiler and burned for fuel value.

The process of the subject invention, employing cascaded boiling pool reactors and light solvent, offers numerous advantages over gas phase reactors and over cascaded slurry loop reactors. First, the subject invention process allows low to medium density polyethylene copolymers of broad or multimodal molecular weight distribution to be economically manufactured. Second, due to the light solvent, the process does not require complex polymer product drying systems that are required for heavy solvent stirred tank reactor processes, and which are both expensive and prone to reliability problems. Third, because the reactors are operated adiabatically, the process is highly resistant to fouling, and partially because of this advantage, very flexible with regard to catalyst choice. Fourth, the process allows any, all, or none of the reactors in the cascade to be operated with hydrogen feed, allowing full flexibility of molecular weight distributions in each reactor. Finally, the process is competitive with both gas phase and loop reactor processes with respect to capital investment and operating costs.

The various feeds, product streams, recycle streams, etc., can be established by methods well known in the art of polyethylene polymerization based on the knowledge of one skilled in the art optionally through use of process modeling software, for example Aspen Plus™ with Polymers Plus™, available from Aspen Technologies, Inc.

A particular advantage of the subject invention is provided when hydrogen is employed in the first reactor and no hydrogen or only limited hydrogen is employed in the second (subsequent) reactor. In many if not most ethylene Ziegler-Natta polymerization catalysts, a reversible site inhibition by hydrogen occurs. During polymerization in a hydrogen rich environment, a loss of catalyst activity occurs due to this inhibition. When the hydrogen concentration in the first reactor is substantially higher than in the second reactor, the catalyst in the catalyst-containing polymer particles from the first reactor regain substantial activity when introduced into the second reactor, reducing or eliminating the need for addition of further catalyst. The catalyst activity may be higher in the second reactor than the first.

In both the foregoing process as well as others, i.e. processes where fresh catalyst feed is introduced into only the first reactor in a series reactor cascade, retained activity of catalyst in polymer particles causes further polymer to be intimately associated with previously produced polymer. The bi- or multimodal polymer product is substantially different and has generally superior physical properties, as compared to processes producing bi- or multimodal resins where the molecular weight distribution differs between particles, for example where individual particles have a predominately unimodal molecular weight distribution, i.e. consist of both polymer particles with lower molecular weight distribution and polymer particles with higher molecular weight distribution. In embodiments of the present invention, the majority of particles will consist of an intimately mixed, highly homogeneous blend of two polyethylenes with significantly different molecular weight distributions, i.e. an intimately mixed blend of low molecular weight and higher molecular weight polyethylenes. This homogeneous blend may be cited as being an interstitial mixture of high and low molecular weight polyethylene. The mass ratio of the low molecular weight fraction and the high molecular weight fraction is preferably 1:1, although blends of other mass ratios are possible. The molecular weight distribution of the blend is generally described as being bimodal.

A further advantage of the present process is that substantially conventional continuous stirred tank reactors (CSTR) may be employed. Such reactors, their construction, installation, and operating parameters are well known, and contribute to the robustness and cost effectiveness of the process. The CSTR are preferably equipped with conventional agitators such as disk impellers, and also with baffles to encourage thorough mixing of the contents, particularly ethylene monomer, hydrogen, and polymer solids. The reactors are generally operated partially liquid full, ie. 50% full, providing a head space of hydrogen (when used), solvent vapor, ethylene monomer, comonomer (when used) and inert gases.

Since the reactor is operated in a boiling mode, both the reactor pressure and temperature are intimately related, and one may be adjusted to control the other. In general, the temperature is maintained by adjusting the pressure of the reactor by return of condensed solvent to the reactor. All or a portion of condensed solvent may be sub-cooled. The amount of solvent returned to the reactor from a reflux accumulator, and the temperature of this condensed solvent, allows effective temperature control.

Slurry loop reactors are conventionally operated at temperatures in the range of 150 to 170° F. (65–77° C.). Such reactors are limited, in general, to temperatures below 185° F. (85° C.) due to the difficulty in maintaining a vapor free slurry at pressures below the design pressure of the reactor, nominally 600 psi (41.4 bar). The light solvent boiling pool reactors, on the other hand may be operated at higher temperatures than conventionally used in slurry loop reactors, for example 190° F. (88° C.), and may be operated at yet higher temperatures if desired. Higher temperature operation offers numerous advantages, including, in general, a higher reaction rate.

In the description of the process below, two boiling pool reactors employing propane as the light solvent are cascaded in series. Both reactors synthesize approximately 30,000 lb/hour (13,400 Kg/hr) of polyethylene, for a total output of approximately 60,000 lb/hr (26,800 Kg/hr) of a bimodal polyethylene copolymer product. Both reactors operate with hydrogen feed. The mass ratio of hydrogen fed to the second reactor in the polymer feed stream (derived from the first reactor) relative to the fresh hydrogen feed to the second reactor is reduced to approximately 0.1 or less. Typical reaction conditions are set forth in Table 1 for a bimodal polyethylene 1-butene copolymer.

TABLE 1

| | |
|---|---|
| First reactor solids | 35 wt % |
| Second reactor solids | 35 wt % |
| First reactor temperature | 180° F. (82° C.) |
| First reactor pressure | 353 psig (25.4 bar) |

TABLE 1-continued

| | |
|---|---|
| Second reactor temperature | 160° F. (71° C.) |
| Second reactor pressure | 276 psig (20 bar) |
| First reactor vapor space hydrogen concentration | 3.2 mole-% |
| First reactor vapor space ethylene concentration | 3.2 mole-% |
| First reactor vapor space 1-butene concentration | 4.5 mole-% |
| First reactor vapor space propane concentration | 88.7 mole-% |
| Second reactor vapor space hydrogen concentration | 0.026 mole-% |
| Second reactor vapor space ethylene concentration | 2.6 mole-% |
| Second reactor vapor space 1-butene concentration | 4.6 mole-% |
| Second reactor vapor space propane concentration | 92.7 mole-% |
| First reactor overhead condenser duty | −34.5 million BTU/hr (−101 MJ/s) |
| Second reactor overhead condenser duty | −37.5 million BTU/hr (−110 MJ/s) |

The process will now be described in relation to FIG. 1. The reactor system consists of two cascaded boiling pool reactors 1,2, and associated equipment. The reactors 1,2 will be referred to as the A and B reactors, respectively. In addition to the reactors themselves, principle equipment components include Reactor A solvent vapor condenser 3, Reactor A reflux accumulator 4, Reactor B solvent vapor condenser 5, and Reactor B reflux accumulator 6, all associated with solvent vapor condensation and return; and Reactor A flash drums 10a and 10b. For a nominal 60,000 lb/hr (26,800 Kg/hr) product output, with 30,000 lb/hr (13,400 Kg/hr) of polymer synthesized in each reactor, the A and B reactors are nominally 33,000 gal (125 kL) reactors with an internal diameter of 14 ft (4.2 m). The reflux accumulators have a 12,000 gal (45 kL) capacity, while the flash drums have a capacity of 5000 gal (19 kL).

As shown, the A and B reactors are equipped with five inlets, respectively, two product slurry outlets, and two vaporized solvent outlets although these numbers can be varied to suit the particular installation, made of purification and recycle, etc. The principle feed of ethylene and comonomer, in this case, 1-butene, is through inlet 20. The reactor solids are maintained at nominally 35 weight percent, with the balance of the reactor contents substantially constituting a liquid phase of propane and comonomer. Supported Ziegler-Natta catalyst is preferably injected with the propane feed through inlet 21. A steam jacket is preferably provided surrounding the reactor to aid in reaching the preferred temperature of operation quickly. As ethylene polymerizes, the heat released, about 1450 BTU/lb (3,424 kJ/kg), causes the propane solvent mixture to boil and the pressure in the reactor to increase, until the preferred temperature of 180° F. (82° C.) is reached. As ethylene continues to polymerize, the propane solvent boils, propane vapor also containing ethylene monomer, hydrogen, 1-butene monomer, and inert gases escape from outlet 25 to condenser 3, where most of the vapor mixture is condensed with cooling water. Condensed propane is collected in reflux accumulator 4, and returned to the reactor through condensed solvent inlet stream 22, at a temperature of about 122° F. (50° C.). Light gases from the reflux accumulator head space, predominately ethane, ethylene, hydrogen, 1-butene, and nitrogen are routed to a solvent recovery system and ethylene, propane, hydrogen, and 1-butene are preferably recycled to the reactor through inlet stream 23.

Ethane and nitrogen are purged from the solvent recovery system and are directed to a boiler where the ethane is burned for fuel value. These latter components, predominantly non-reactive gases, may be termed "reactor inerts."

Toward the bottom of the A reactor 1 is a continuous discharge line 26, whose flow is controlled by valve 27 which is manipulated to vary the discharge flow in response to a signal from level controller 28. The polymer slurry stream from the A reactor consists of approximately 35 weight percent polyethylene copolymer and 57 weight percent propane, the balance being predominately ethylene and 1-butene. A polymer slurry discharge stream is routed to the first intermediate flash drum 10a, where volatiles, including substantial propane, are flashed at nominally 320 psig (23 bar), producing a partially hydrogen depleted 40 wt. % polymer slurry stream 35. A warm propane stream 50, recovered from the process, for example, from a propane solvent recovery system recycle gas compressor, is mixed with stream 35 and flows to the second intermediate flash drum 61 which operates at nominally 300 psig (21.7 bar), where the polymer slurry is further hydrogen depleted. The hydrogen depleted polymer slurry stream 41 from the second intermediate flash drum 106 serves as an inlet stream to the B reactor 2.

In addition to polymer slurry inlet stream 41, comprising substantially a 40 wt. % slurry of low molecular weight polyethylene (i.e. polyethylene with Mn of 4000 Da) in propane, additional fresh feed of about 30,000 lb/hr ethylene, 4.5 lb/hr (2.0 kg/hr) H2, and 455 lb/hr (203 kg/hr) 1-butene constitutes B reactor feed 42. In addition to B reactor feeds 41 and 42 and A reactor feeds 20–23, both the A and B reactors are fed with recycle propane streams 24 and 43, respectively, in order to maintain reactor slurry concentrations at nominally 35 wt. % solids.

The second reactor polymer slurry is removed through continuous discharge line 45, whose flow is controlled by valve 46, which is manipulated to vary the discharge flow in response to a signal from level controller 47. The polymer slurry stream from the A reactor consists of approximately 35 wt. % polyethylene copolymer and 58 wt. % propane, the balance being predominantly ethylene, and 1-butene. Product polymer is harvested from the slurry through a series of flash drums and conventional polymer powder drying equipment.

Control elements in FIG. 1 are labeled "TC" for temperature controller "PC" for pressure controller, "LC" for level controller, and "FC" for flow controller.

In the process described above, about 30,000 lb/hr (13, 400 kg/hr) of polyethylene copolymer having a number average molecular weight Mn of about 4000 and a polydispersity index of about 5 is synthesized in Reactor A. Reactor A runs at about 180° F. (82° C.) and 353 psig (25.4 bar), with a residence time of about 110 minutes. The catalyst is approximately 45% deactivated as it leaves the Reactor A. The B reactor runs at 160° F. (71° C.) and 276 psig (20 bar), and synthesizes polymer with $M_n$ of 16,000 Da. The composite molecular weight of the harvested polyethylene copolymer is about 10,000 Da, and is characterized by a large polydispersity index of about 25. The molecular weight distribution is bimodal. The B reactor residence time is approximately 85 minutes, and no fresh catalyst feed is used. Note that while the production rates of the reactors are substantially equivalent, the B reactor residence time is less than that of the A reactor, despite the fact that the B reactor driving forces are lower.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. In the claims, the terms "a" and "an" mean one or more than one unless indicated to be the contrary. The term "continuously" with regard to introduction of reactants, solvents, catalysts, etc. means a mode of introduction which allows continuous polymerization, i.e. a continuous as opposed to a batch process. Actual addition may be truly continuous, i.e. without interruption, or incremental, such that the frequency of addition is high enough so as to allow for the continuous production of olefin polymers.

What is claimed is:

1. A process for the production of low to medium density polyethylene homo and copolymers, said process comprising a) introducing ethylene, hydrogen, a light aliphatic solvent, optionally one or more further olefin monomers, and an ethylene polymerization catalyst into a first reactor;

b) operating said first reactor at the bubble point of the reactor contents, such that heat generated by the polymerization reaction is removed via the heat of vaporization of a boiling light solvent mixture;

c) condensing a vapor comprising light solvent from said first reactor to form a light solvent condensate, optionally subcooling said light solvent condensate, and returning said light solvent condensate or a portion thereof to said first reactor, such that return of said light solvent condensate to said reactor maintains the reactor at a desired first reactor pressure and first reactor temperature;

d) removing a polyethylene slurry stream from said first reactor containing light solvent and polyethylene polymer of number average molecular weight Mn, and directing said polyethylene slurry stream to a hydrogen removal system to form a hydrogen depleted polyethylene slurry stream;

e) directing said hydrogen depleted polyethylene slurry stream to a second reactor;

f) introducing one or more reactant stream(s) comprising ethylene, the same light aliphatic solvent as said first reactor, optionally hydrogen, optionally one or more further olefin monomers, and optionally further ethylene polymerization catalyst into said second reactor;

g) operating said second reactor at the bubble point of the reactor contents, such that heat generated by the polymerization reaction is removed via the heat of vaporization of a boiling light solvent mixture;

h) condensing a vapor comprising light solvent from said second reactor to form a light solvent condensate, optionally subcooling said light solvent condensate, and returning said light solvent condensate or a portion thereof to said second reactor, such that return of said light solvent condensate to said reactor maintains the reactor at a desired second reactor pressure and second reactor temperature;

i) polymerizing ethylene and optional further comonomer(s) in said second reactor to produce a polyethylene polymer with a number average molecular weight $Mn_2$, $Mn_2$ and Mn, being different; and j) removing a bimodal polyethylene slurry stream from said second reactor and removing light solvent and unreacted monomer(s) from said bimodal polyethylene slurry stream to obtain a solid bimodal polyethylene product.

2. The process of claim 1, wherein said light solvent comprises propane or isobutane.

3. The process of claim 1, wherein no additional catalyst is introduced into said second reactor.

4. The process of claim 1, wherein said second reactor temperature is lower than said first reactor temperature and said second reactor pressure is lower than said first reactor pressure.

5. The process of claim 3, wherein said second reactor temperature is lower than said first reactor temperature and said second reactor pressure is lower than said first reactor pressure.

6. The process of claim 5, said first reactor and said second reactor both have average residence times, wherein the average residence time in said second reactor is lower than the average residence time in said first reactor.

7. The process of claim 3, wherein $Mn_2 > Mn$.

8. The process of claim 1, wherein said low to medium density polyethylene has a density of 0.935 g/cm$^3$ or less.

9. The process of claim 1, wherein said low to medium density polyethylene has a density of from about 0.88 g/cm$^3$ to about 0.930 g/cm$^3$.

10. The process of claim 1, wherein a further olefin comonomer is added to at least one of said first reactor and/or said second reactor.

11. The process of claim 10 wherein said further olefin comonomer comprises one or more olefin comonomers selected from the group consisting of propene, 1-butene, 2-butene, 1-pentene, 1-hexene, 1-octene, 1-decene, and 1-dodecene.

12. The process of claim 1, wherein said first reactor vapor comprising light solvent is condensed and at least a portion of the light solvent condensate is directed to a reflux accumulator before being returned to said first reactor.

13. The process of claim 1, wherein said second reactor vapor comprising light solvent is condensed and at least a portion of the light solvent condensate is directed to a reflux accumulator before being returned to said second reactor.

14. The process of claim 12, wherein vapors in a headspace of said reflux accumulator are fractionated to remove reactor inerts to form at least one recycle stream comprising hydrogen, light solvent, ethylene, and optionally further olefin monomer(s), wherein when a plurality of recycle streams are formed, each stream may comprise a single component or a plurality of components, wherein at least one recycle stream is recycled to said first reactor, to said second reactor, or to both said first and said second reactors.

15. The process of claim 1, wherein no hydrogen is introduced to said first reactor and no intermediate hydrogen removal system is employed.

16. The process of claim 1, wherein heat is input to either or both reactors in order to maintain the temperatures of all reactor system surfaces in physical contact with the reaction slurry at or slightly above the temperature of the reactor contents.

17. The process of claim 1, wherein said hydrogen removal system comprises at least one flash drum.

18. The process of claim 1, wherein said hydrogen removal system comprises two series-connected flash drums.

19. The process of claim 18, wherein a recycle stream of warm light solvent is mixed with a polymer slurry outlet stream of a first of said two series-connected flash drums.

* * * * *